US011567517B1

(12) United States Patent
Zhu

(10) Patent No.: US 11,567,517 B1
(45) Date of Patent: Jan. 31, 2023

(54) HAND WARMER STEP-LESS REGULATING CIRCUIT

(71) Applicant: Shenzhen Chinaunion Technology Co., Ltd., Shenzhen (CN)

(72) Inventor: Xueping Zhu, Chenzhou (CN)

( * ) Notice: Subject to any disclaimer, the term of this patent is extended or adjusted under 35 U.S.C. 154(b) by 0 days.

(21) Appl. No.: 17/659,177

(22) Filed: Apr. 14, 2022

(30) Foreign Application Priority Data

Mar. 31, 2022 (CN) ......................... 202220729709.5

(51) Int. Cl.

| | |
|---|---|
| ***G05F 7/00*** | (2006.01) |
| ***G05F 1/46*** | (2006.01) |
| ***H02J 7/00*** | (2006.01) |
| ***G05D 23/24*** | (2006.01) |
| ***H05B 1/02*** | (2006.01) |
| ***H05B 45/42*** | (2020.01) |

(52) U.S. Cl.

CPC ............... *G05F 1/46* (2013.01); *G05D 23/24* (2013.01); *H02J 7/0068* (2013.01); *H05B 1/0252* (2013.01); *H05B 45/42* (2020.01)

(58) Field of Classification Search

CPC .......... G05F 1/46; G05D 23/24; H02J 7/0068; H05B 1/0252; H05B 45/42

See application file for complete search history.

(56) References Cited

U.S. PATENT DOCUMENTS 4,571,533 A * 2/1986 Dey .................... H02J 7/00302 320/DIG. 20
4,758,772 A * 7/1988 Lang ................ G01R 19/16542 320/DIG. 22
4,847,471 A * 7/1989 Wallgren ........... H05K 13/0486 219/501
4,855,572 A * 8/1989 Wallgren ........... H05K 13/0486 219/466.1
4,924,176 A * 5/1990 Tremblay .............. H01M 6/505 320/DIG. 15
4,983,813 A * 1/1991 Van Tulleken .......... H05B 3/80 219/534
5,736,948 A * 4/1998 Mitsuishi ............ H03M 1/1215 341/142
5,742,676 A * 4/1998 Courtois ................. H04M 1/76 396/399
6,064,044 A * 5/2000 Jerome ................ H05B 1/0269 392/456

(Continued)

*Primary Examiner* — Daniel Kessie
*Assistant Examiner* — Brian K Baxter
(74) *Attorney, Agent, or Firm* — Rumit Ranjit Kanakia

(57) ABSTRACT

The invention discloses a hand warmer step-less regulating circuit, and relates to the field of hand warmer regulating circuits; the hand warmer step-less regulating circuit comprises a comparing chip, pin 2 of the chip is connected with an NTC temperature sensor, the NTC temperature sensor is connected with a power supply VCC through resistor R16, pin 8 of the chip is connected with the power supply VCC, the power supply VCC is connected with light-emitting diode D3, and light-emitting diode D3 and the power supply VCC are connected with resistor R13 in series; pin 5 is connected with an output end of the NTC temperature sensor; by arranging the slide rheostat or an encoder, any temperature in a required area can be reached through heating, and any temperature required by a user can be maintained to realize a better temperature experience.

7 Claims, 20 Drawing Sheets

(56) References Cited

U.S. PATENT DOCUMENTS

| | | | | |
|---|---|---|---|---|
| 2008/0054169 | A1* | 3/2008 | Okada | G01D 5/34715<br>250/231.13 |
| 2012/0242487 | A1* | 9/2012 | Huang | G01K 3/005<br>340/584 |
| 2014/0265899 | A1* | 9/2014 | Sadwick | H05B 45/395<br>315/200 R |
| 2018/0026316 | A1* | 1/2018 | Teng | H01M 10/44<br>320/134 |
| 2018/0368223 | A1* | 12/2018 | Johnson | H02J 9/065 |

* cited by examiner

HAND WARMER STEP-LESS REGULATING CIRCUIT

FIELD OF THE INVENTION

The utility model relates to the field of hand warmer regulating circuits, in particular to a hand warmer step-less regulating circuit.

BACKGROUND OF THE RELATED ART

A hand warmer is a kind of automatic warming health care product that is developed by using physical and chemical principles. With the gradual popularization and use of lithium batteries, hand warmers with lithium batteries have been used more and more widely. The function of lithium batteries is mainly used, internal heating pieces can be used for heating, and USB interfaces are used for charging and discharging. However, single-button switches with fixed gears are generally adopted by existing hand warmers with lithium batteries, thus only fixed gears can be used to regulate the temperature. Generally, only temperature set by three gears can be reached, and temperature in other ranges cannot be achieved. Especially when the hand warmers are used outdoors, as the outdoor temperature is low, a low gear of a hand warmer with a fixed gear switch cannot meet the heating requirements, and the temperature set by a high gear would be too high, thus it is quite inconvenient to select gears.

SUMMARY OF THE INVENTION

The utility model aims to provide a hand warmer step-less regulating circuit to solve the problems in the above background art.

In order to realize the above purposes, the utility model provides the following technical schemes that: a hand warmer step-less regulating circuit comprises a comparing chip, pin 1 and pin 7 of the chip are output pins, pin 2 of the chip is connected with a Negative Temperature Coefficient ("NTC") temperature sensor, the NTC temperature sensor is connected with a power supply VCC through resistor R16, pin 8 of the chip is connected with the power supply VCC, the power supply VCC is connected with light-emitting diode D3, light-emitting diode D3 and the power supply VCC are connected with resistor R13 in series, and an output end of the light-emitting diode D3 is grounded;

pin 2 of the chip is grounded through resistor R17, pin 8 is grounded through capacitor C11, pin 6 of the chip is connected with the power supply VCC through resistor R18, pin 6 is grounded through resistor R19, an input end of resistor R16 and an input end of resistor R18 are connected with resistor R15, resistor R23 and resistor R14 in series, wherein resistor R14 is grounded; slide rheostat SWR1 is connected between resistor R23 and resistor R14 in parallel, a sliding end of the slide rheostat is connected with pin 3 of the chip, and pin 4 of the chip is grounded;

pin 5 is connected with an output end of the NTC temperature sensor.

Preferably, the hand warmer step-less regulating circuit further comprises a microcontroller unit ("MCU") chip and a plurality of light-emitting diode ("LED") display lights, wherein pin 10, pin 11, pin 12 and pin 13 of the MCU control chip are connected with different LED display lights respectively; pin 9 of the MCU control chip connects the multiple LED display lights together through resistor R6 in series; pin 16 of the MCU control chip is grounded, pin 1 of the MCU control chip is grounded through capacitor C11, pin 1 of the MCU control chip is grounded through resistor R11 and slide resistor RA1, and a sliding end of slide resistor RA1 is connected with pin 15 of the MCU control chip;

the output end of the NTC temperature sensor is grounded, the NTC temperature sensor is connected with pin 1 of the MCU control chip through resistor R14, pin 3 of the MCU control chip is grounded through switch RS1, pin 2 of the MCU control chip is grounded through switch S2, and pin 14 of the MCU control chip is connected between the NTC temperature sensor and resistor R14.

Preferably, the hand warmer step-less regulating circuit further comprises a lithium battery charging-discharging module, and the lithium battery charging-discharging module is connected with pin 4 to pin 7 of the MCU control chip.

Preferably, an encoder is used to replace slide resistor RA1, a shielded wire of the encoder is grounded, one phase of the encoder is connected with pin 2 of the MCU control chip through resistor R14 and connected with pin 1 of the MCU control chip through resistor R12; another phase of the encoder is connected with pin 3 of the MCU control chip through resistor R13 and connected with pin 1 of the MCU control chip through resistor R11; the output end of the NTC temperature sensor is grounded, and pin 3 of the MCU control chip is grounded through the switch S2;

the NTC temperature sensor is connected with pin 1 of the MCU control chip through resistor R14, and pin 14 of the MCU control chip is connected between the NTC temperature sensor and resistor R14.

Preferably, two-phase encoders are preferred encoders.

Compared with the prior art, the utility model has the beneficial effects that:

according to the hand warmer step-less regulating circuit, by arranging the slide rheostat or the encoder, even linear regulation of the slide or roll adjustable resistor or the encoder can be used, thus any temperature in a required area can be reached through heating, and any temperature required by a user can be maintained to realize a better temperature experience.

BRIEF DESCRIPTION OF THE DRAWINGS

FIG. 1 with partial views FIGS. 1A-1E provide a circuit diagram of the slide rheostat and NTC temperature detector of the hand warmer step-less regulating circuit; wherein

FIG. 2 with partial views FIGS. 2A-2F provide a circuit diagram of temperature regulation of the slide rheostat and NTC temperature detector of the hand warmer step-less regulating circuit; wherein

FIG. 3 with partial views FIGS. 3A-3F provide a circuit diagram of temperature regulation of the encoder and NTC temperature detector of the hand warmer step-less regulating circuit; wherein

DETAILED DESCRIPTION OF THE PREFERRED EMBODIMENTS

The technical schemes of the embodiments of the utility model shall be described clearly and completely with reference to the drawings of the embodiments of the utility model. Apparently, the described embodiments are only part of rather than all the utility model. On the basis of the embodiments of the utility model, all other embodiments obtained by those of ordinary skill in the art without creative efforts fall into the protection scope of the utility model.

Figure 1:
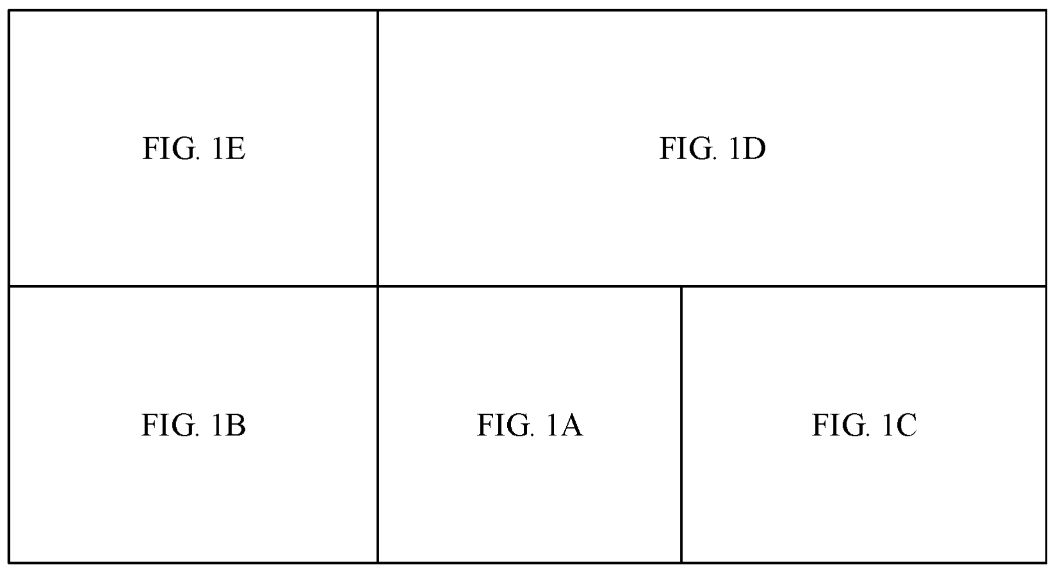
Figure 1A:
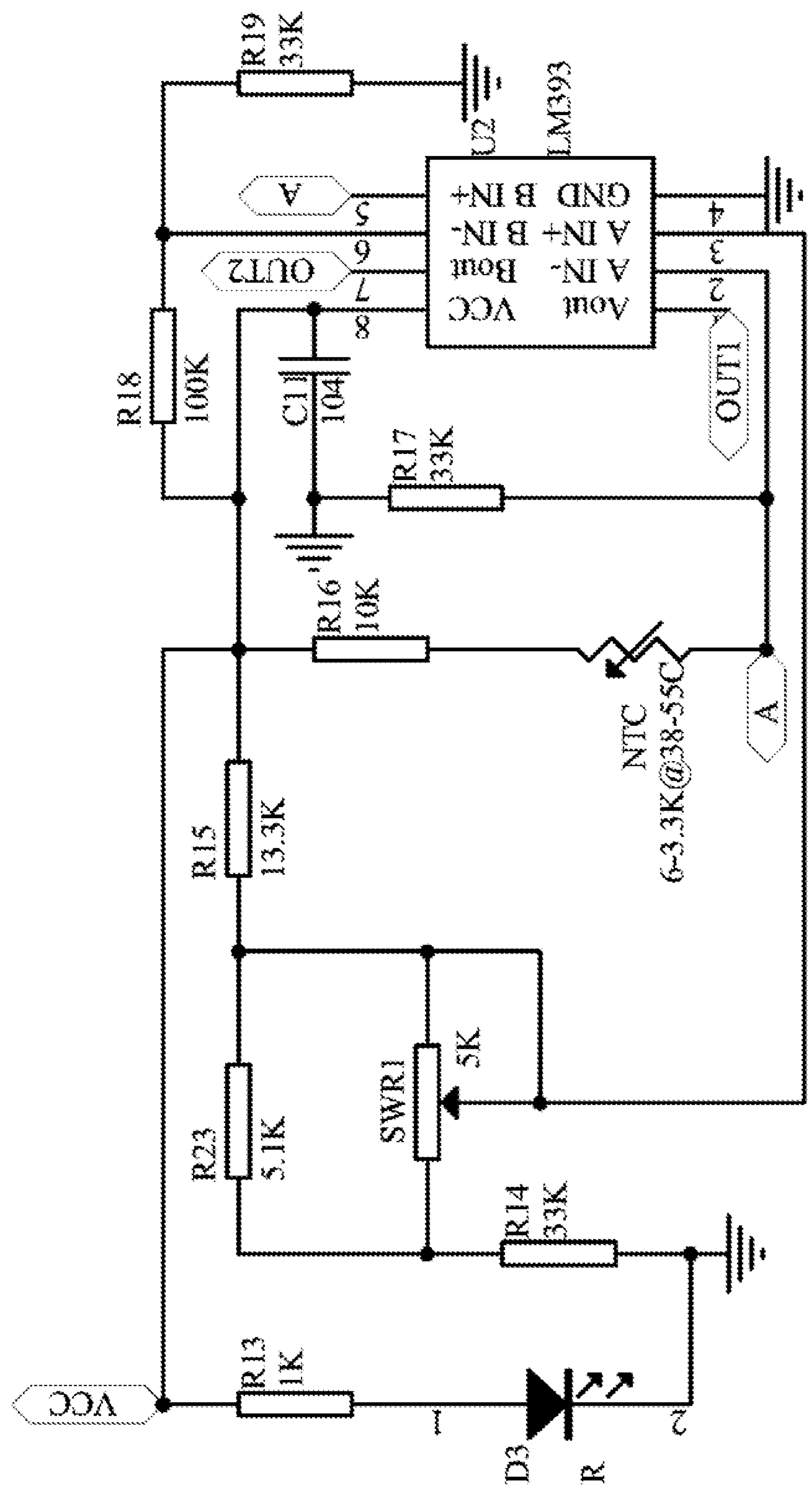
FIG. 1A is a circuit diagram of the temperature regulating control module.
Figure 1B:
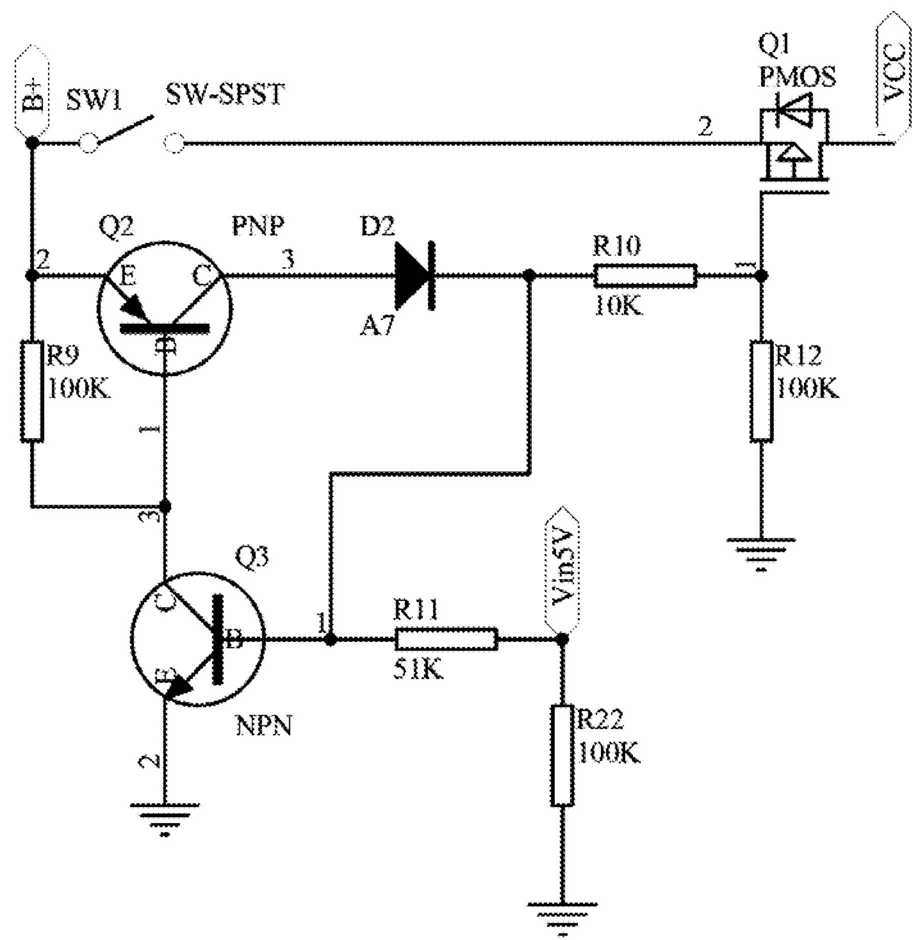
FIG. 1B is a circuit diagram of the charging protecting module.
Figure 1C:
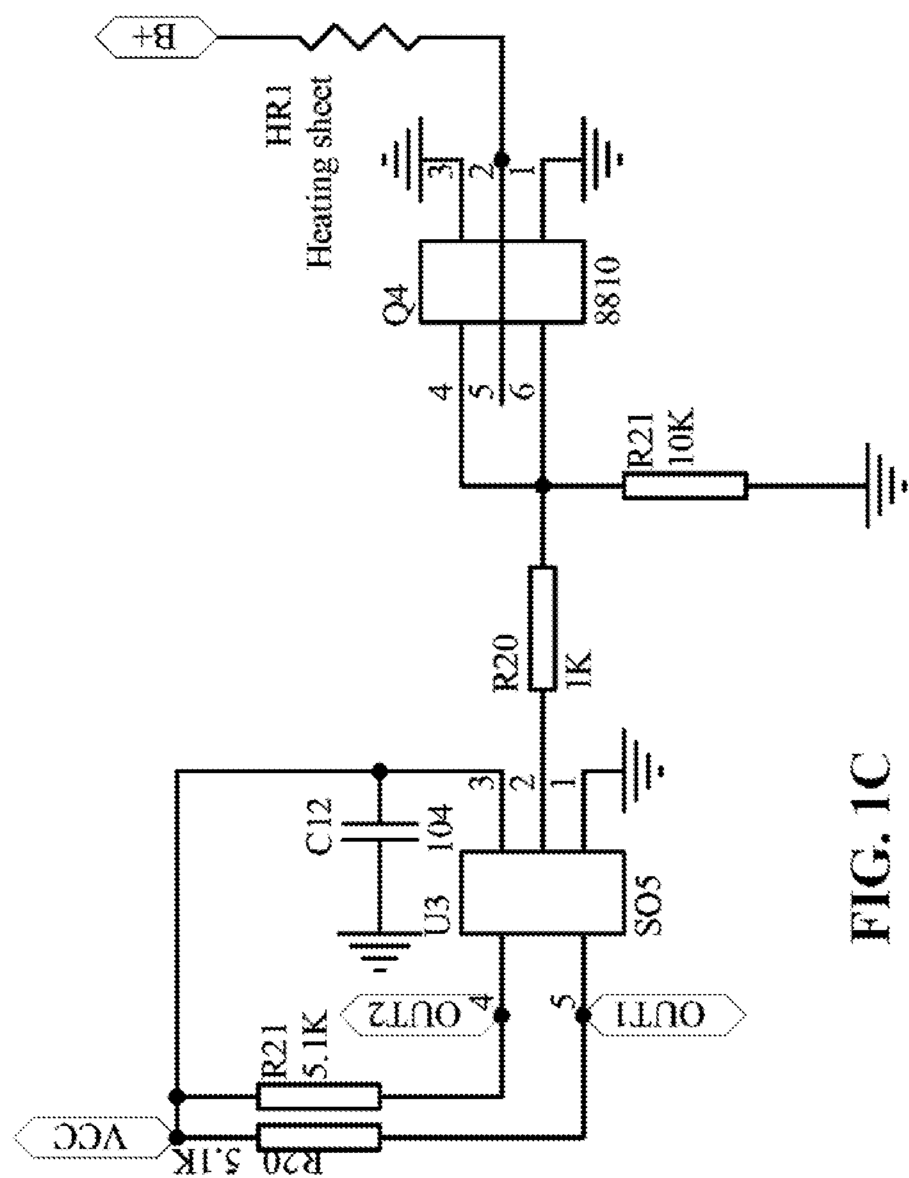
FIG. 1C is a circuit diagram of the heating control module.
Figure 1D:
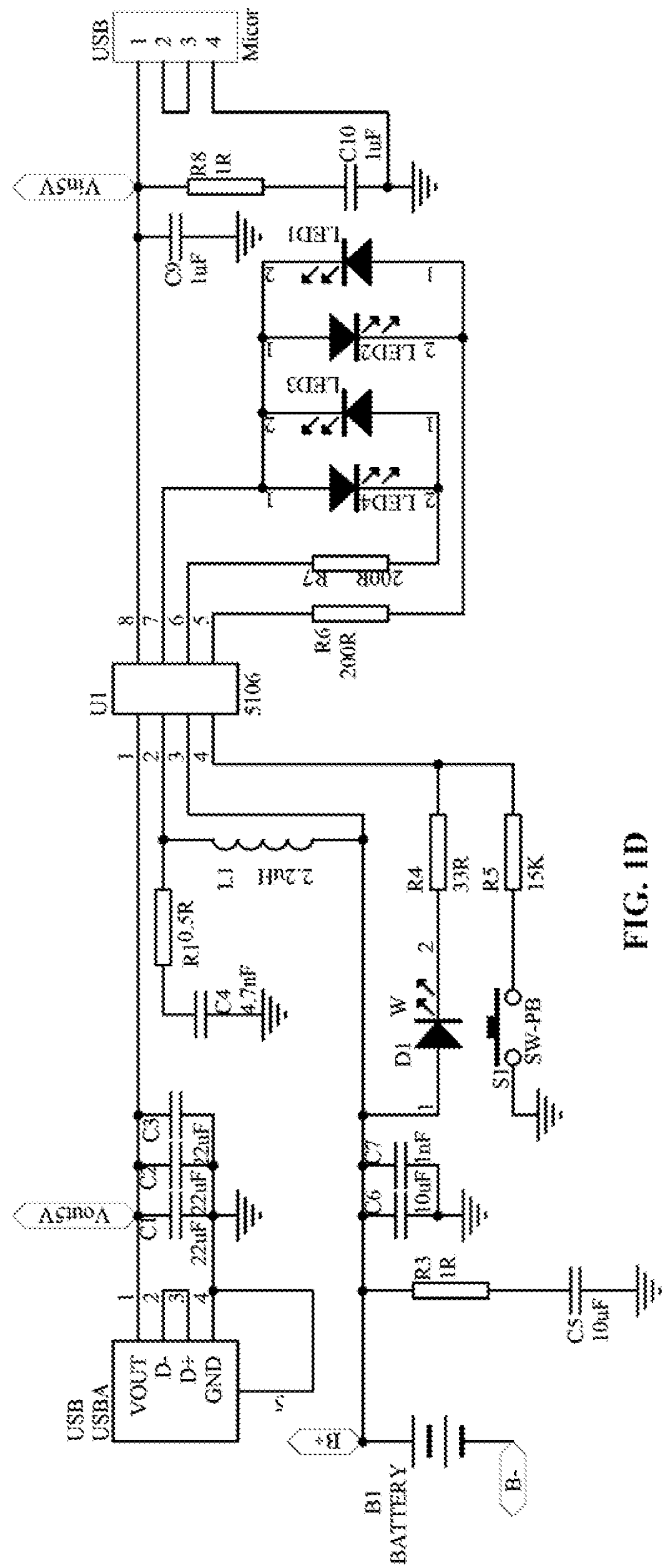
FIG. 1D is a circuit diagram of the lithium battery charging-discharging module.
Figure 1E:
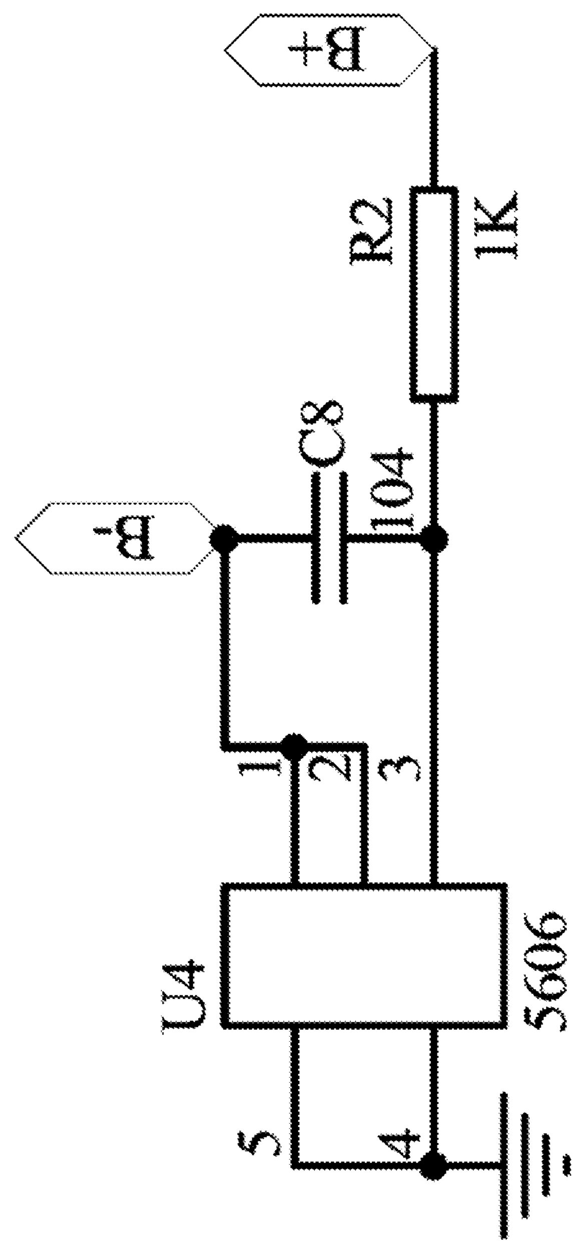
FIG. 1E is a circuit diagram of the lithium battery charging-discharging protecting module.

With reference to FIG. 1 with partial view FIG. 1A, the embodiment provides a hand warmer step-less regulating circuit. FIG. 1A provides a temperature regulating control module, which comprises a comparing chip U2, wherein the adopted comparing chip U2 is LM393; pin 1 of the comparting chip U2 is output pin OUT 1, pin 7 of the comparting chip U2 is output pin OUT 2, the two output pins transmit signal output to a heating module, as shown in FIG. C; and the output pin OUT 1 and the output pin OUT 2 are connected with pin 5 and pin 4 of a heating chip U3 respectively; as the heating module is a circuit module that is commonly used by an existing hand warmer, it is unnecessary to go into details.

Pin 2 of the comparting chip U2 is connected with the NTC temperature sensor, which is a thermal resistor and probe with the characteristics of high sensitivity and responding speed. The NTC temperature sensor is connected with the power supply VCC through resistor R16. Pin 8 of the comparting chip U2 is connected with the power supply VCC, the power supply VCC is connected with light-emitting diode D3, and the power supply VCC is used to supply power for the NTC temperature sensor, the light-emitting diode D3 and the chip; the light-emitting diode D3 and the power supply VCC are connected with resistor R13 in series, and an output end of the light-emitting diode D3 is grounded;

pin 2 of the comparting chip U2 is grounded through resistor R17, pin 8 of the comparting chip U2 is grounded through capacitor C11, pin 6 of the comparting chip U2 is connected with the power supply VCC through resistor R18, pin 6 of the comparing chip U2 is grounded through resistor R19, an input end of resistor R16 and an input end of resistor R18 are connected with resistor R15, resistor R23 and resistor R14 in series; resistor R15, resistor R23 and resistor R14 are connected in series, wherein the other end of resistor R14 is grounded; slide rheostat SWR1 is connected between resistor R23 and resistor R14 in parallel, a sliding end of the slide rheostat SWR1 is connected with pin 3 of the chip, and pin 4 of the chip is grounded. Pin 5 is connected with an output end of the NTC temperature sensor.

By using the comparing chip U2, the adjustable set temperature of the slide rheostat SWR1 in the circuit and the temperature detected by the NTC temperature sensor can be compared; through temperature comparison, heating will be stopped when the required temperature is reached, and automatic heating will be carried out when the temperature is lower than the required temperature.

Lithium batteries or storage batteries supply power for the circuit, and as shown in FIG. 1 with partial views of FIGS. 1A-1E, a lithium battery charging-discharging module, a charging protecting module and a lithium battery charging-discharging protecting module are further arranged in the circuit to manage charging and discharging of the battery and realize battery protection; a heating control module is further arranged, the heating control module, the lithium battery charging-discharging module and the lithium battery charging-discharging protecting module are all commonly used by the existing hand warmers, as shown in FIG. 1, and FIGS. 1A-1E.

By arranging the charging protecting module, whether the hand warmer is turned on when the battery is charged or the battery is charged in the power-on state of the hand warmer, the heating of the hand warmer will be automatically stopped. After charging in the power-on state, the hand warmer needs to be turned on and off to start heating again after the battery is fully charged, so as to avoid heating of the hand warmer during charging.

As shown in FIG. 1 with partial views FIGS. 1A-1E, the charging protecting module comprises a PNP bipolar junction transistor and an NPN bipolar junction transistor, emitting electrode E of the PNP bipolar junction transistor is connected with power supply VCC through a PMOS transistor, collector electrode C of the PNP bipolar junction transistor is connected with diode D2, the negative electrode of diode D2 is grounded through resistor R10 and resistor R12, and resistor R10 is connected with resistor R12 in series; base electrode B of the PNP bipolar junction transistor is connected with collector electrode C of the NPN bipolar junction transistor, and collector electrode C of the NPN bipolar junction transistor is connected with the PMOS transistor through resistor R9; the gate electrode of the PMOS transistor is grounded through resistor R12, the drain electrode of the PMOS transistor is connected with the power supply VCC, and the source electrode of the PMOS transistor is connected with emitting electrode E of the PNP bipolar junction transistor and resistor R9. Switch SW1 is arranged on the circuit of the source electrode of the PMOS transistor, emitting electrode E of the NPN bipolar junction transistor is grounded, base electrode B of the NPN bipolar junction transistor is connected with the input end of resistor R10, and base electrode B of the NPN bipolar junction transistor is grounded through resistor R11 and resistor R22; resistor R11 is connected with resistor R22 in series, and the input end of resistor R22 is connected with pin 1 of the USB charging interface of the lithium battery charging-discharging module.

Emitting electrode E of the PNP bipolar junction transistor and the input end of resistor R9 are connected with the positive electrode of the battery.

In order to realize a convenient display of the temperature, the MCU control chip can be used for expansion; adjustable linear regulation is used, thus multi-temperature-range linear regulation and LED digital display of real-time temperature data (or multiple lights are adopted to realize linear display of temperature) can be realized; the MCU control chip is used by existing hand warmers with the temperature display function.

Figure 2:
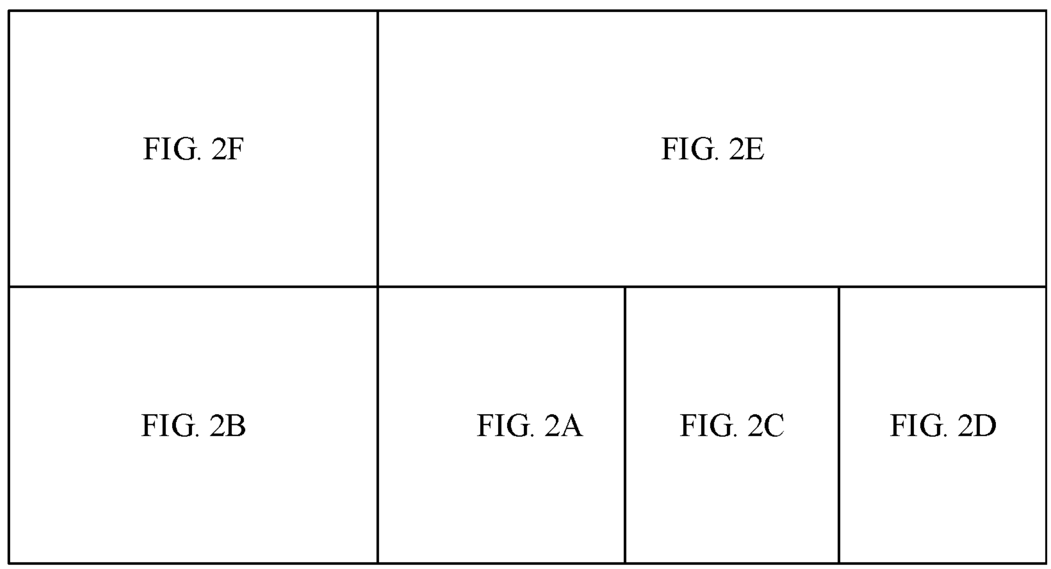
Figure 2A:
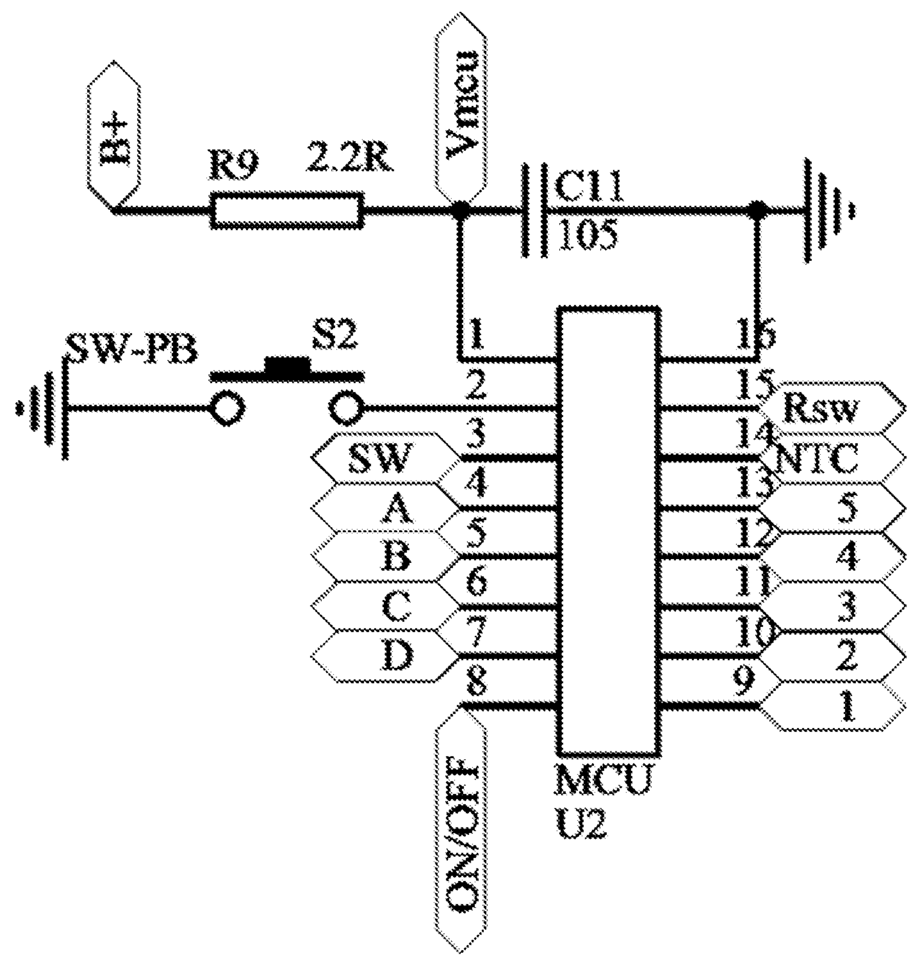
FIG. 2A is a circuit diagram of the MCU control module.
Figure 2B:
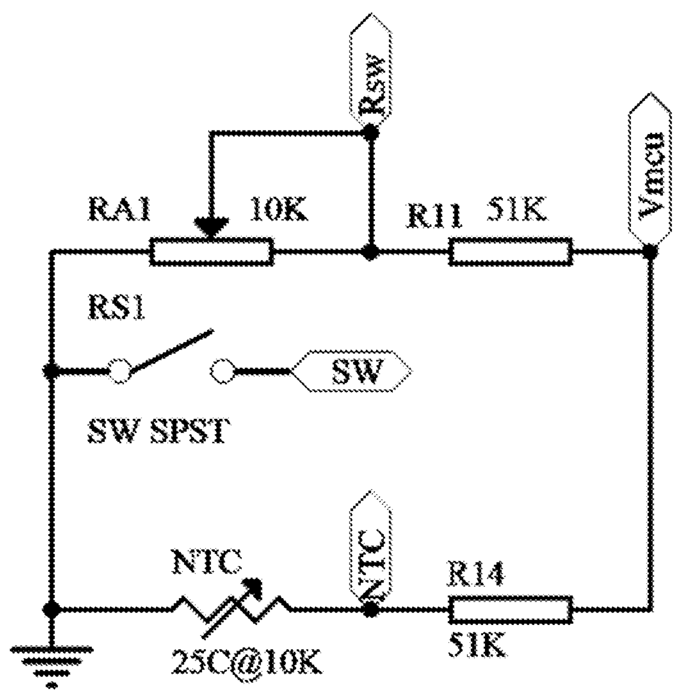
FIG. 2B is a circuit diagram of the NTC temperature detecting-regulating module.
Figure 2C:
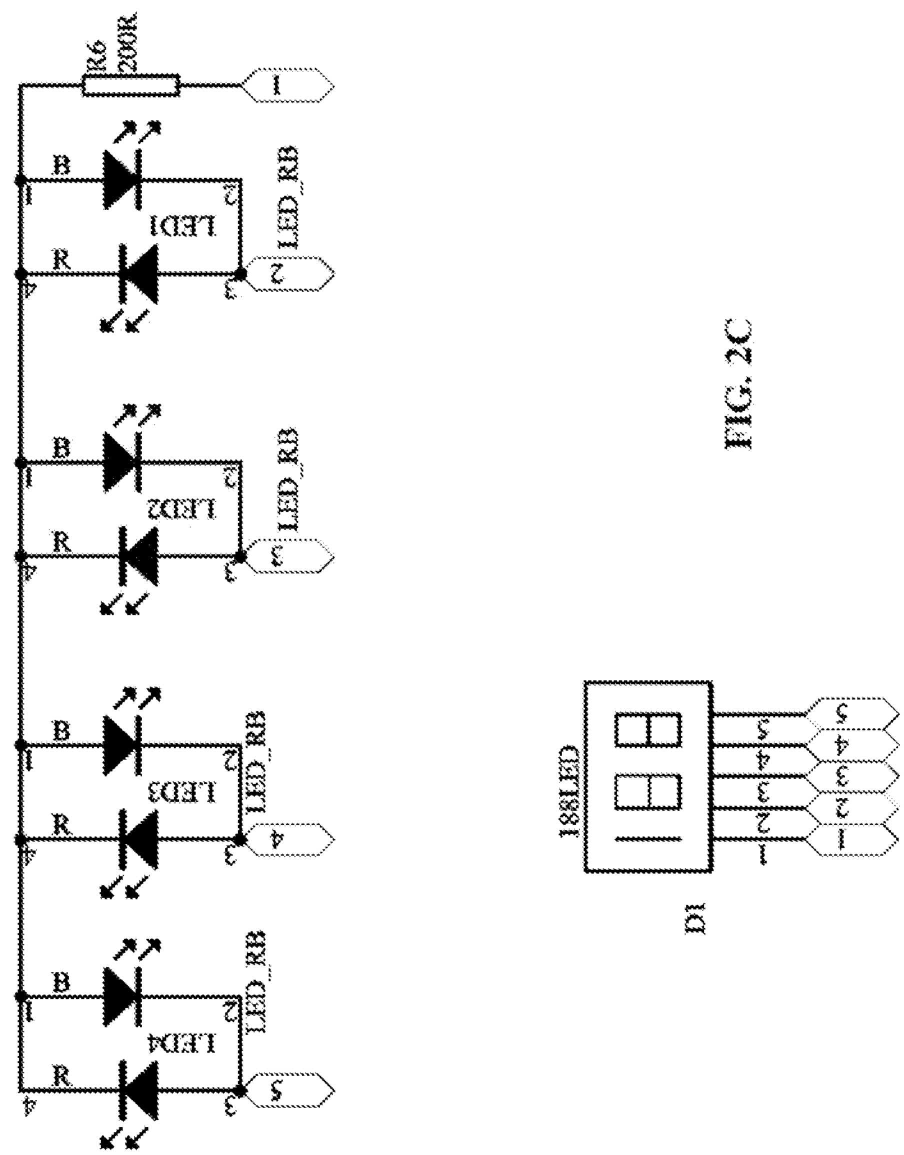
FIG. 2C is a circuit diagram of the selectable LED light display or digital display.
Figure 2D:
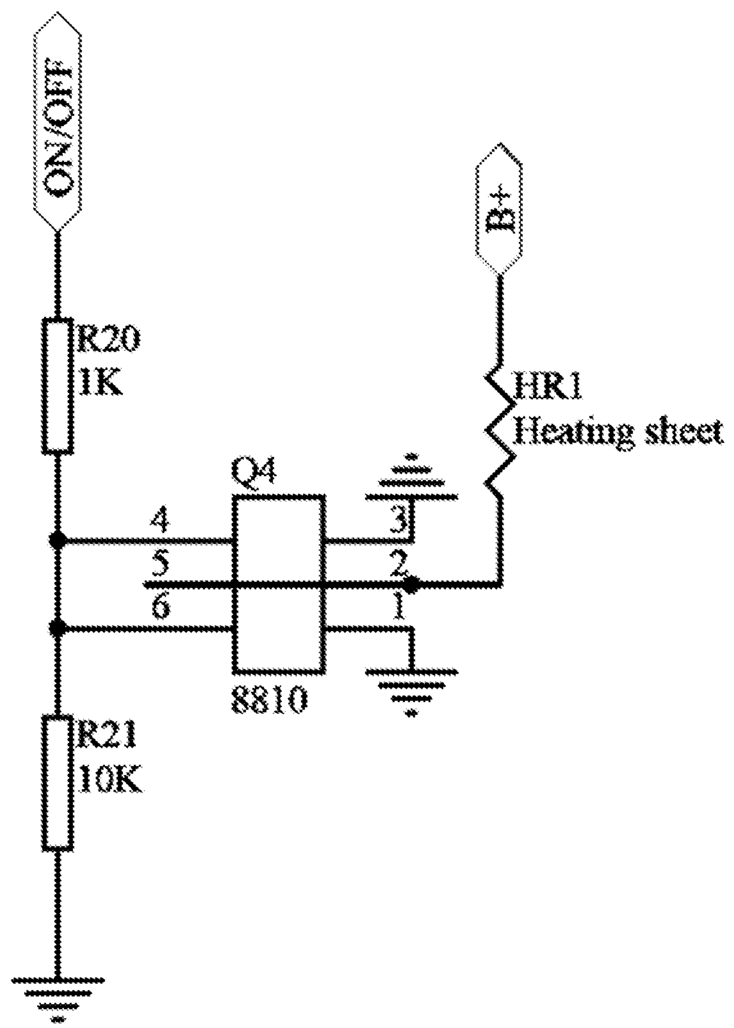
FIG. 2D is a circuit diagram of the heating module.
Figure 2E:
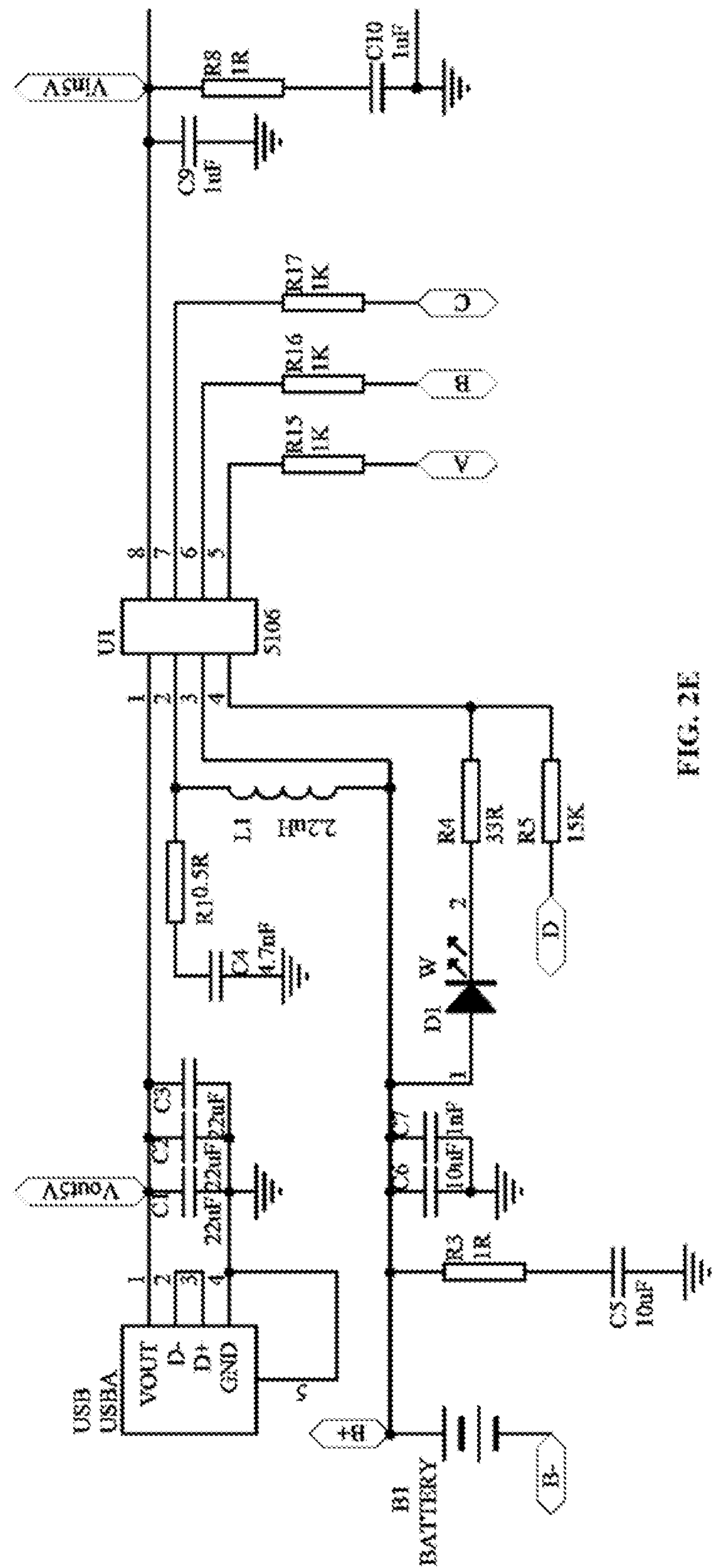
FIG. 2E is a circuit diagram of the lithium battery charging-discharging module.
Figure 2F:
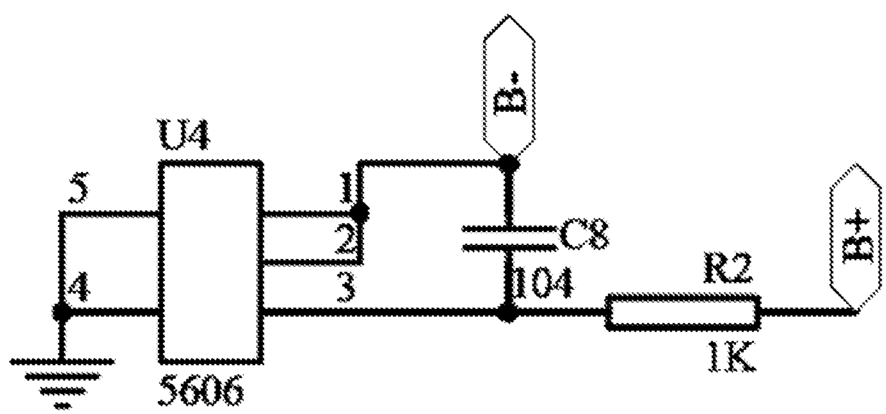
FIG. 2F is a circuit diagram of the lithium battery charging-discharging protecting module.

As shown in FIG. 2 with partial views FIGS. 2A-2F, the LED display lights are used for temperature display, pin 10, pin 11, pin 12 and pin 13 of the MCU control chip, as shown in FIG. 2A, are connected with different groups of LED display lights respectively, and pin 9 of the MCU control chip connects the plurality of LED display lights through resistor R6 in series; as shown in FIG. 2C, a circuit diagram of a selectable LED light display or digital display is shown. In the selectable LED light display or digital display, every two LED lights form a group, the negative electrode of one LED light is connected with the positive electrode of another LED light, and the remaining positive electrode of the first LED light and the remaining negative electrode of the second LED light are connected with resistor R6; pin 16 of the MCU control chip is grounded, pin 1 of the MCU control chip is grounded through capacitor C11, pin 1 of the MCU control chip is grounded through resistor R11 and slide resistor RA1, and a sliding end of slide resistor RA1 is connected with pin 15 of the MCU control chip; by controlling slide resistor RA1, which is the same slide resistor in FIG. 1, multi-temperature-range linear regulation can be realized, no gear is needed as a regulating button can slide to any position during regulation, therefore, step-less regulation of the temperature can be realized. Pin 8 of the MCU control chip is a switch pin.

As shown in FIG. 2B, a circuit diagram of the NTC temperature detecting-regulating module is provided. The output end of the NTC temperature sensor is grounded, the NTC temperature sensor is connected with pin 1 of the MCU control chip through resistor R14, pin 3 of the MCU control chip is grounded through switch RS1, and pin 2 of the MCU control chip is grounded through switch S2; pin 14 of the MCU control chip is connected between the NTC temperature sensor and resistor R14, and the lithium battery charging-discharging module is connected with pin 4 to pin 7 of the MCU control chip as shown in FIG. 2. With MCU control chip and LED digital display, a multi-point temperature display can be realized, and the current temperature can be read more clearly.

Figure 3:
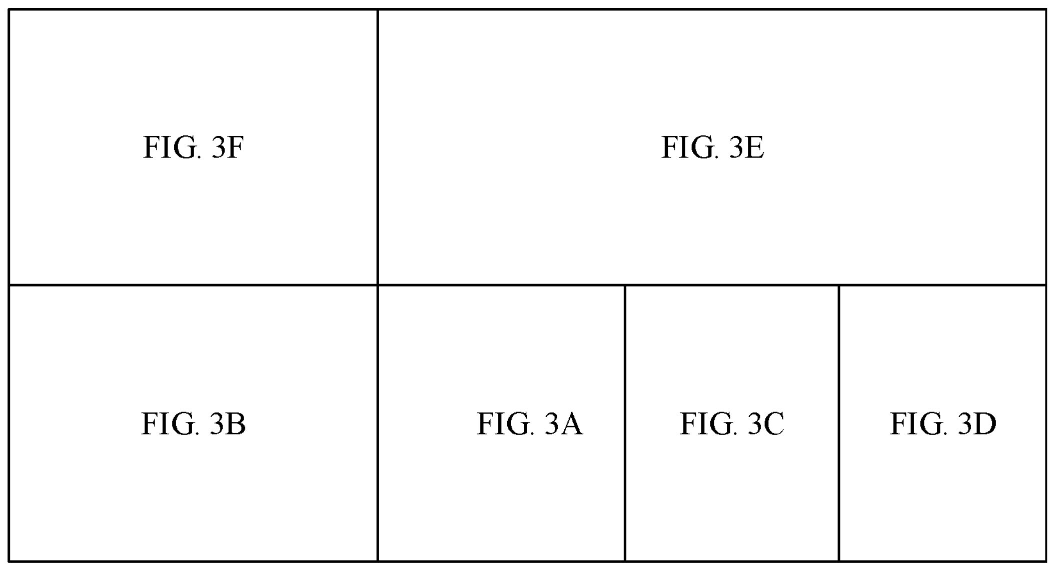
Figure 3A:
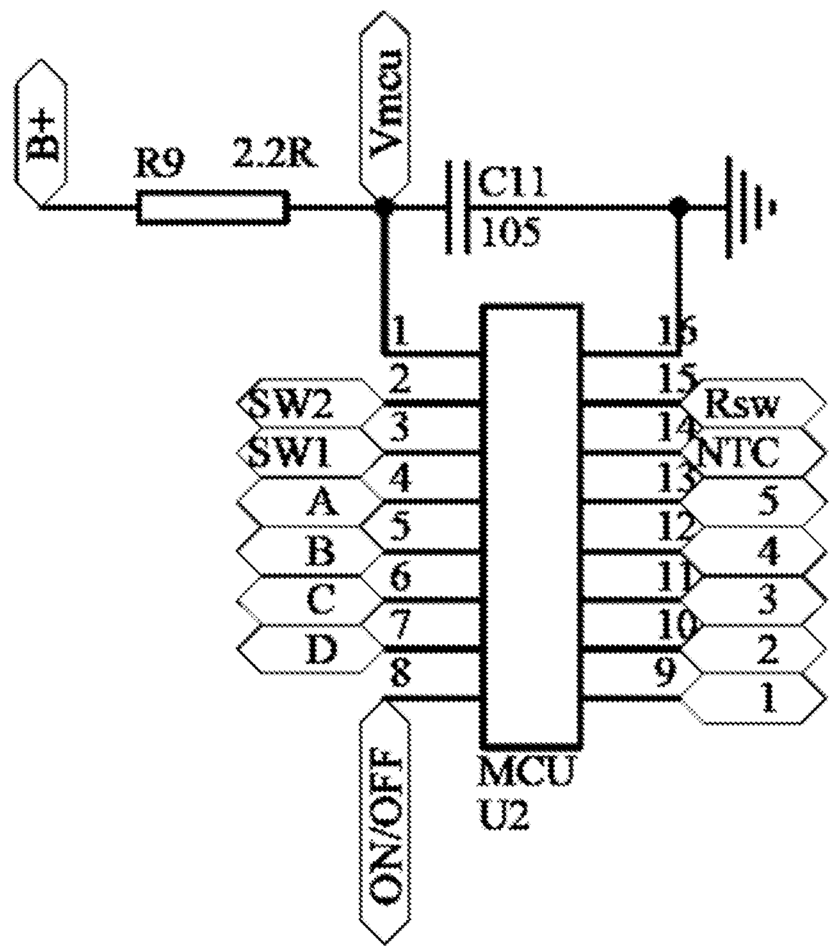
FIG. 3A is a circuit diagram of the MCU control module.
Figure 3B:
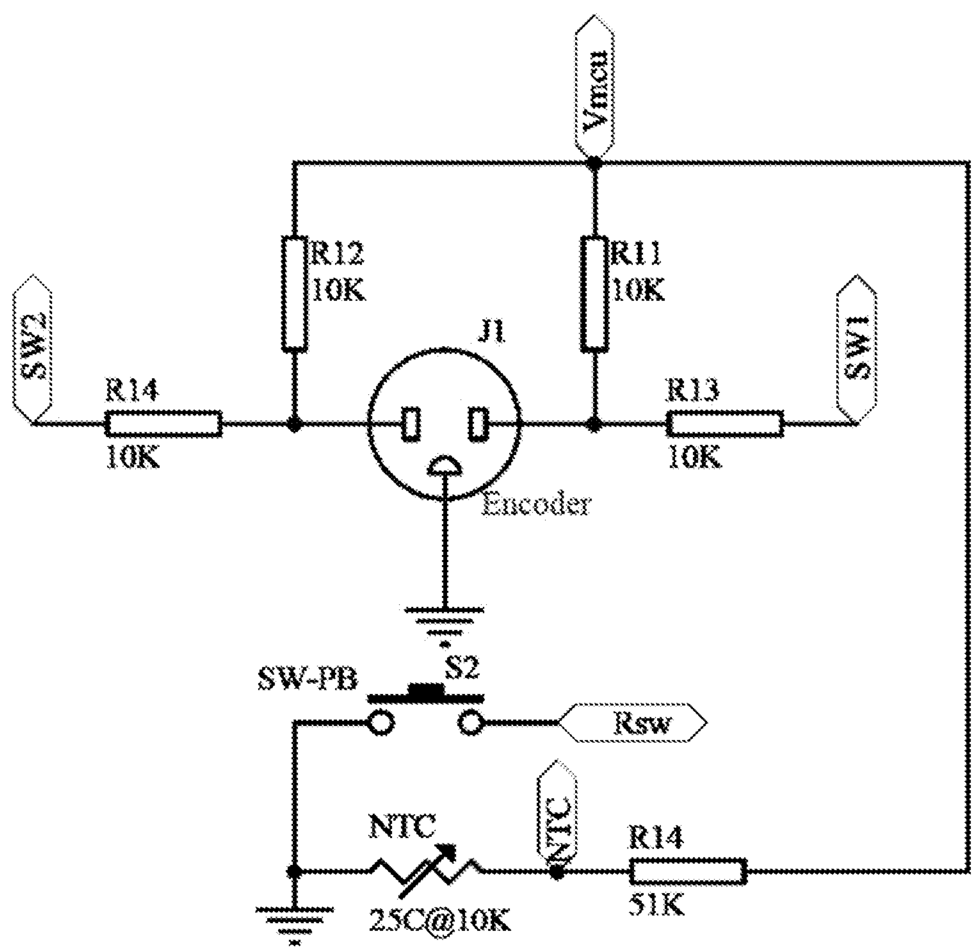
FIG. 3B is a circuit diagram of the NTC temperature detecting-regulating module.
Figure 3C:
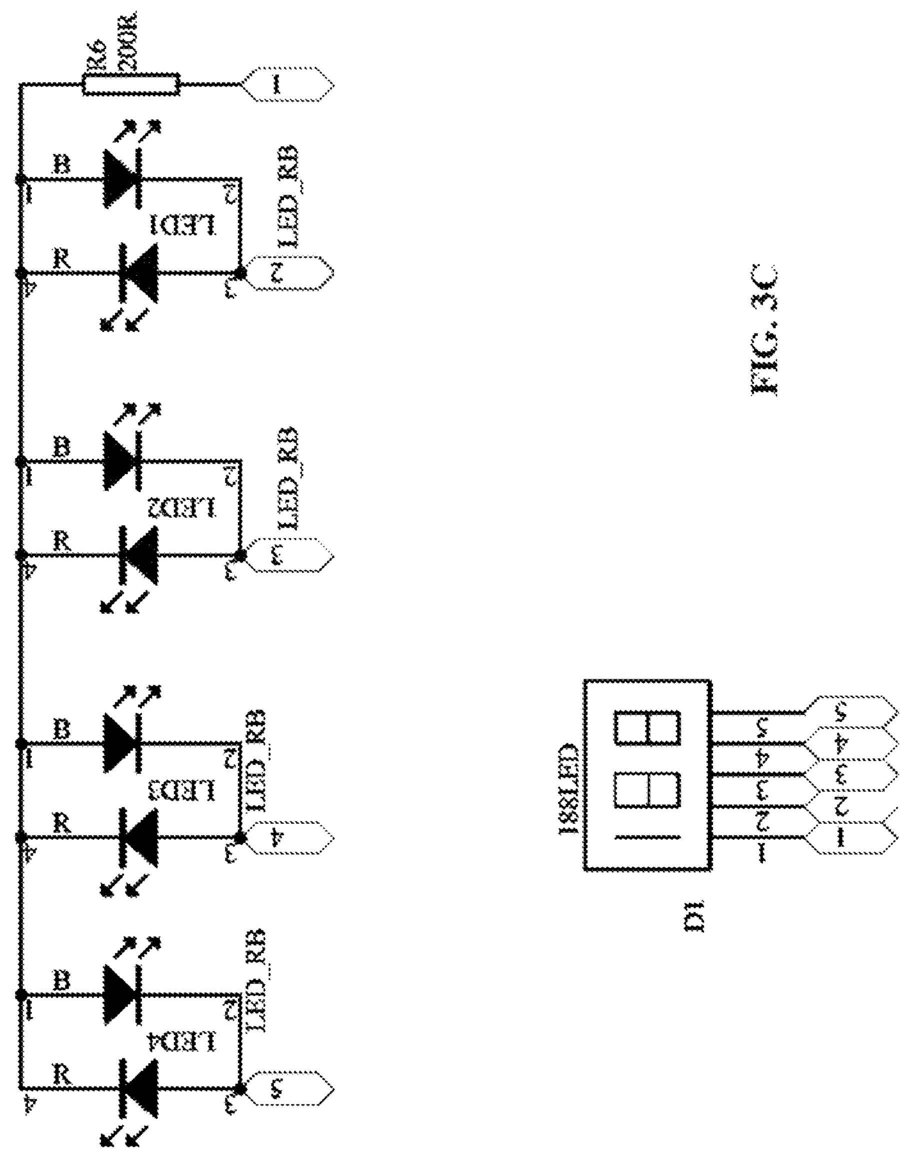
FIG. 3C is a circuit diagram of the selectable LED light display or digital display.
Figure 3D:
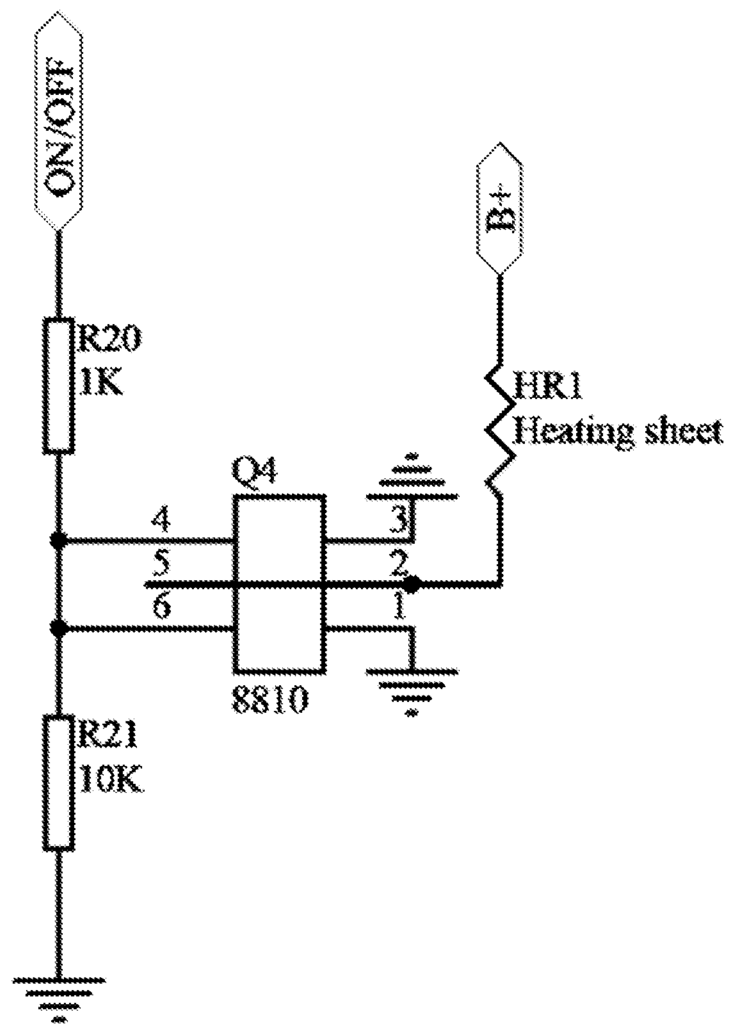
FIG. 3D is a circuit diagram of the heating module.
Figure 3E:
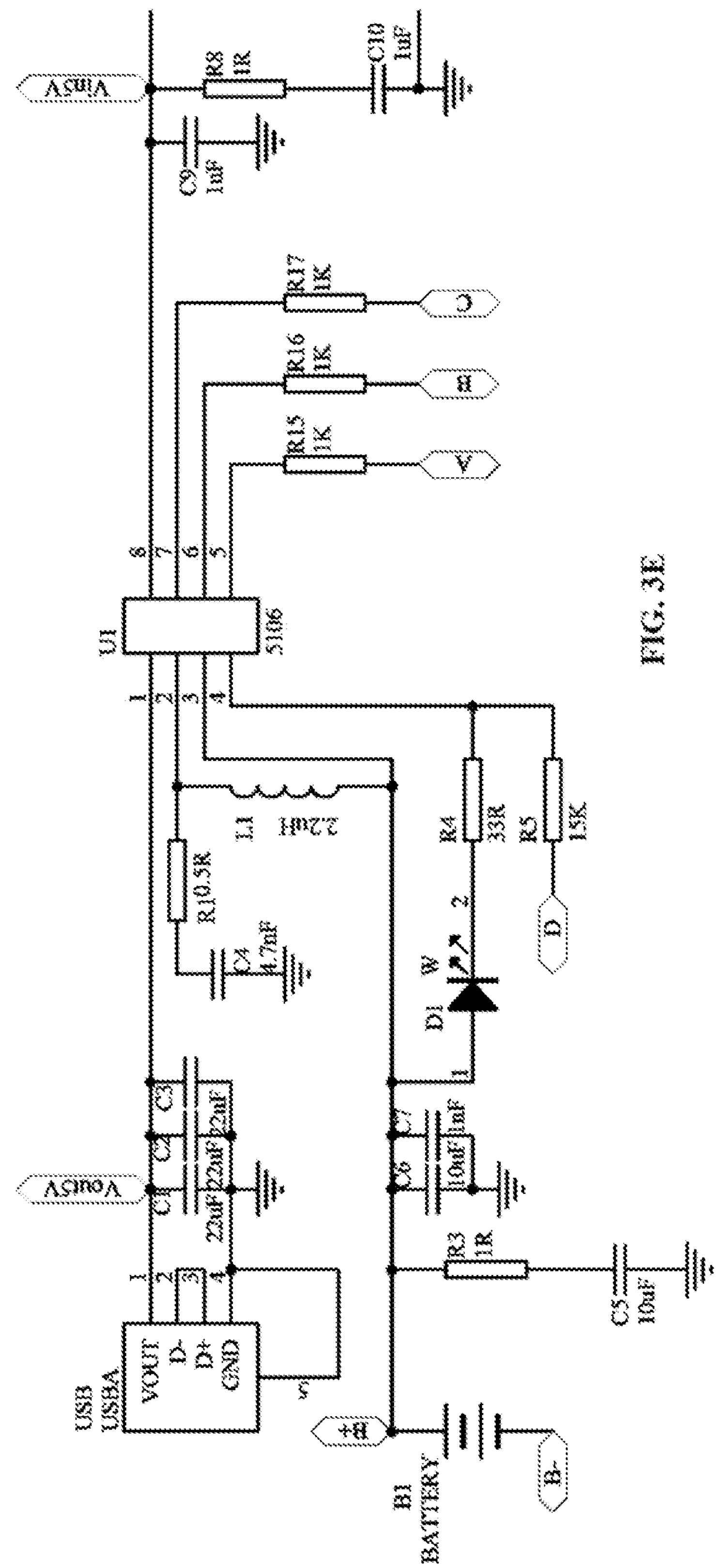
FIG. 3E is a circuit diagram of the lithium battery charging-discharging module.
Figure 3F:
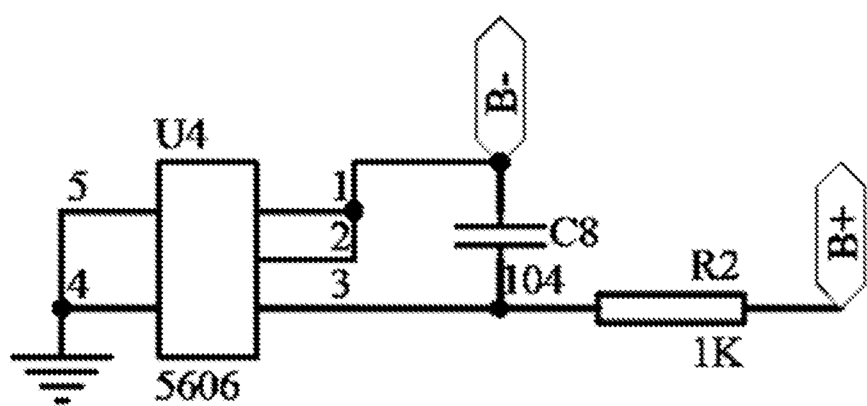
FIG. 3F is a circuit diagram of the lithium battery charging-discharging protecting module.

Furthermore, an encoder can be used to realize step-less temperature regulation of the hand warmer, and two-phase encoders are preferred; as shown in FIG. 3 with partial views FIGS. 3A-3F, a shielded wire of the encoder is grounded, one phase of the encoder is connected with pin 2 of the MCU control chip through resistor R14 and connected with pin 1 of the MCU control chip through resistor R12; another phase of the encoder is connected with pin 3 of the MCU control chip through resistor R13 and connected with pin 1 of the MCU control chip through resistor R11; as shown in FIG. 3B, a circuit diagram of the NTC temperature detecting-regulating module is provided. The output end of the NTC temperature sensor is grounded, and pin 3 of the MCU control chip is grounded through the switch S2; each time the encoder rotates, a signal is transmitted to the MCU control chip, after receiving the signal from the encoder, the MCU control chip determines whether the temperature needs to be increased or decreased to further change the output temperature, and the mentioned principle is the same as the control principle for air conditioners of vehicles.

The NTC temperature sensor is connected with pin 1 of the MCU control chip through resistor R14, and pin 14 of the MCU control chip is connected between the NTC temperature sensor and resistor R14. The connecting methods of other pins are the same as the connecting methods in FIG. 2 with partial views FIGS. 2A-2F, thus it is unnecessary to go into details.

Although the embodiments of the utility model have been shown and described, for those of ordinary skill in this field, without departing from the principles and essence of the utility model, various changes, modifications, substitutions and variants of the embodiments can be made; and the scope of the utility model is defined by the attached claims and their equivalents.

The invention claimed is:

1. A hand warmer step-less regulating circuit, comprising:

a comparing chip, pin 1 and pin 7 of the comparing chip are output pins, pin 2 of the comparing chip is connected with a Negative Temperature Coefficient sensor ("NTC temperature sensor"), the NTC temperature sensor is connected with a power supply VCC through a resistor R16, pin 8 of the comparing chip is connected with the power supply VCC, the power supply VCC is connected with a light-emitting diode D3, the light-emitting diode D3 and the power supply VCC are connected with a resistor R13 in series, and an output end of the light-emitting diode D3 is grounded;

pin 2 of the comparing chip is grounded through a resistor R17, pin 8 of the comparing chip is grounded through a capacitor C11, pin 6 of the comparing chip is connected with the power supply VCC through a resistor R18, pin 6 the comparing chip is grounded through a resistor R19, an input end of the resistor R16 and an input end of the resistor R18 are connected with a resistor R15, a resistor R23 and a resistor R14 in series, wherein the resistor R14 is grounded;

the output end of the light-emitting diode D3 is connected to the resistor R14;

a slide rheostat SWR1 is connected between the resistor R23 and the resistor R14 in parallel, a sliding end of the slide rheostat SWR1 is connected with pin 3 of the comparing chip, and pin 4 of the comparing chip is grounded; and pin 5 of the comparing chip is connected with an output end of the NTC temperature sensor.

2. The hand warmer step-less regulating circuit according to claim 1, further comprising a microcontroller ("MCU") chip and a plurality of light-emitting diode ("LED") display lights, wherein pin 10, pin 11, pin 12 and pin 13 of the MCU chip are connected with the plurality of LED display lights, respectively;

pin 9 of the MCU chip is connected to the plurality of LED display lights together through a resistor R6 in series;

pin 16 of the MCU chip is grounded, pin 1 of the MCU chip is grounded through the capacitor C11, pin 1 of the MCU chip is grounded through a resistor R11 and a slide resistor RA1, and a sliding end of the slide resistor RA1 is connected with pin 15 of the MCU chip;

the output end of the NTC temperature sensor is grounded, the NTC temperature sensor is connected with pin 1 of the MCU chip through the resistor R14, pin 3 of the MCU chip is grounded through a switch RS1, pin 2 of the MCU chip is grounded through a switch S2, and pin 14 of the MCU chip is connected between the NTC temperature sensor and the resistor R14.

3. The hand warmer step-less regulating circuit according to claim 2, further comprising a lithium battery charging-discharging module, and the lithium battery charging-discharging module is connected with pin 4 to pin 7 of the MCU chip.

4. The hand warmer step-less regulating circuit according to claim 2, wherein an encoder is used to replace the slide resistor RA1, a shielded wire of the encoder is grounded, one phase of the encoder is connected with pin 2 of the MCU chip through the resistor R14 and connected with pin 1 of the MCU chip through a resistor R12;

another phase of the encoder is connected with pin 3 of the MCU chip through the resistor R13 and connected with pin 1 of the MCU chip through the resistor R11;

the output end of the NTC temperature sensor is grounded, and pin 3 of the MCU chip is grounded through the switch S2;

the NTC temperature sensor is connected with pin 1 of the MCU chip through the resistor R14, and pin 14 of the MCU chip is connected between the NTC temperature sensor and the resistor R14.

5. The hand warmer step-less regulating circuit according to claim 4, wherein the encoder is a two-phase encoder.

6. The hand warmer step-less regulating circuit according to claim 3, wherein an encoder is used to replace the slide resistor RA1, a shielded wire of the encoder is grounded, one phase of the encoder is connected with pin 2 of the MCU chip through the resistor R14 and connected with pin 1 of the MCU chip through a resistor R12;

another phase of the encoder is connected with pin 3 of the MCU chip through the resistor R13 and connected with pin 1 of the MCU chip through the resistor R11;

the output end of the NTC temperature sensor is grounded, and pin 3 of the MCU chip is grounded through the switch S2;

the NTC temperature sensor is connected with pin 1 of the MCU chip through the resistor R14, and pin 14 of the MCU chip is connected between the NTC temperature sensor and the resistor R14.

7. The hand warmer step-less regulating circuit according to claim 6, wherein the encoder is a two-phase encoder.

* * * * *